April 11, 1939. W. H. GILLE 2,154,041
FUEL COMBUSTION CONTROL SYSTEM
Filed Sept. 9, 1935 2 Sheets-Sheet 1

Inventor
Willis H. Gille
By George H. Fisher
Attorney

Patented Apr. 11, 1939

2,154,041

UNITED STATES PATENT OFFICE 2,154,041

FUEL COMBUSTION CONTROL SYSTEM

Willis H. Gille, St. Paul, Minn., assignor to Minneapolis-Honeywell Regulator Company, Minneapolis, Minn., a corporation of Delaware Application September 9, 1935, Serial No. 39,700

5 Claims. (Cl. 158—28)

This invention relates to an improvement in a fuel combustion control system and more particularly to means for checking the condition of the spark employed to ignite the fuel.

In a system for the combustion of fuel, wherein the fuel is completely turned off at times, such as an oil burner system, it is necessary to provide some means for initially igniting the fuel. Such means commonly comprises a high tension circuit having a spark gap therein. When the spark across this gap is of a proper intensity the fuel will be readily ignited. However, if no spark occurs, or if by reason of the electrodes being improperly spaced, or for some other reason there is not a proper spark, combustion will not take place and fuel will continue to be fed to the burner. If the ignition means should, after a brief period of such defective operation, begin to operate properly, an explosion may result due to the ignition of the accumulated fuel.

Means have been provided in the prior art for checking the condition of the spark and making the operation of the fuel feeding means dependent upon the presence of a proper spark. Such means have, however, been defective either in that they did not differentiate between a proper spark and one due to a substantial short circuit at the spark gap or between a proper spark and one occurring in some other portion of the high voltage spark gap circuit.

An object of the present invention is to provide a means for checking the spark of an ignition system of a fuel burner and operating so that the motor circuit of the fuel feeding means will not be closed until a proper spark exists at the gap.

A further object of this invention is to provide a means for checking the spark in such a system in which said means will not be responsive to a spark occurring across the leads between the secondary coil of the ignition transformer and the spark gap.

A further object of the invention is to provide a means for cooperating with said spark checking means so that in the event that combustion does not take place after a predetermined interval of time, the ignition circuit will be opened thus stopping the operation of the spark checking means until the defective condition has been remedied.

Figure 1:
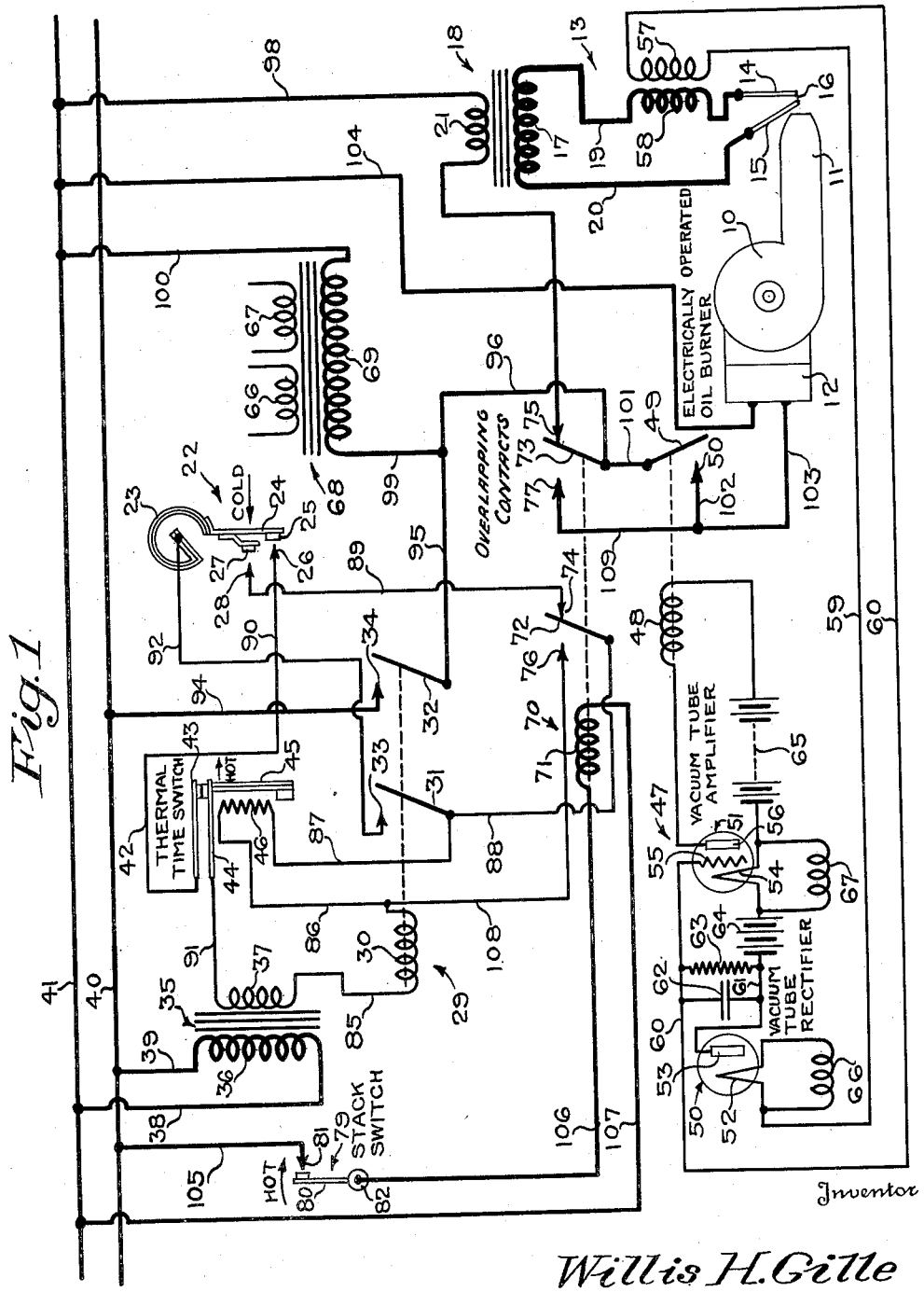
Figure 2:
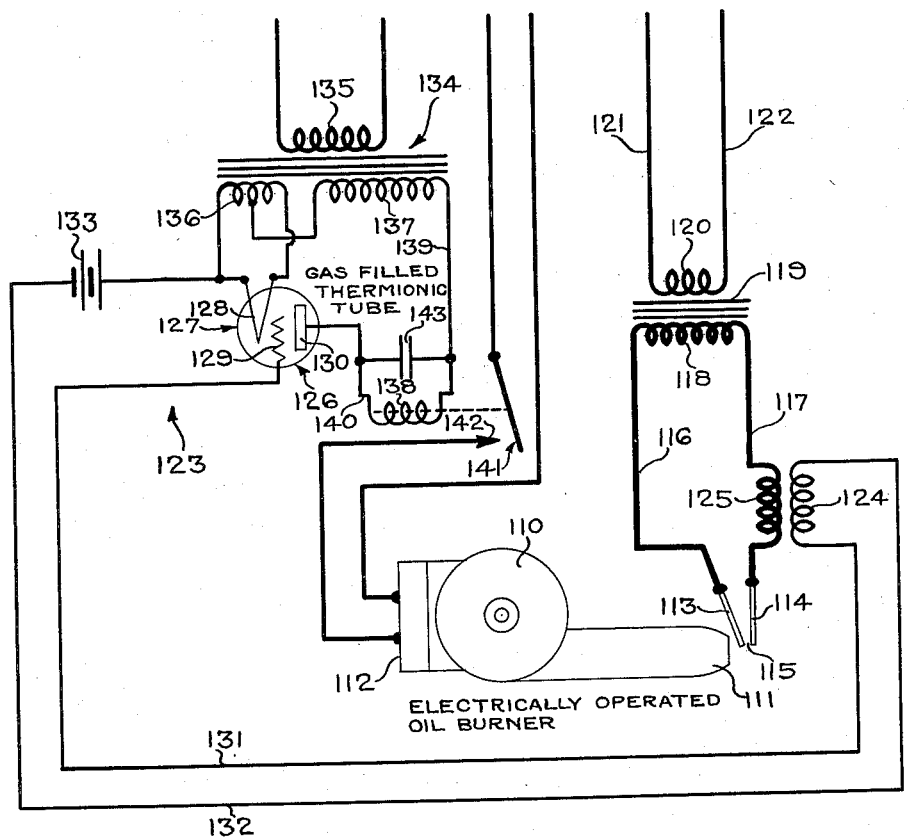

Further objects of the invention will be obvious from the accompanying specification and drawings, of which Figure 1 is a schematic showing of a fuel combustion control system embodying my new and novel spark check, and of which Figure 2 is a schematic showing of a modified form of my spark check.

Referring to Figure 1 of my drawings, an electrically operated oil burner is designated by the reference numeral 10. Said oil burner is provided with a nozzle 11 through which fuel is fed. Said burner is operated by an electrical motor of which 12 is the terminal box thereof.

The fuel issuing from nozzle 11 is ignited by means generally indicated by the reference character 13. This ignition means comprises a pair of electrodes 14 and 15, spaced apart to provide a spark gap 16 therebetween. These electrodes are connected to a secondary 17 of a step-up transformer 18 by conductors 19 and 20. Said transformer 18 is provided with a primary 21 connected to a suitable source of power.

Located in the space to be heated and controlling the operation of my system, is a thermostat designated generally by the reference numeral 22. This thermostat comprises a bimetallic element 23 to which is rigidly attached a contact arm 24. Attached to said contact arm is a contact 25 adapted to move into engagement with a contact 26. Also attached to the contact arm is a further contact 27 adapted to engage with a contact 28. Contacts 27 and 28 are spaced a greater distance apart than contacts 25 and 26 so that upon the contact arm moving in the direction of contacts 26 and 28, the contact 25 will engage with contact 26 before contacts 27 and 28 will be brought into engagement. As indicated by a legend on the drawings, the bimetallic element is so arranged as to cause the contact arm to move into engagement with said contacts upon a decrease in temperature. The thermostat is initially adjusted so that said engagement takes place when the temperature falls below a predetermined value.

Thermostat 22 controls the action of a relay indicated generally by the reference character 29. This relay comprises a relay coil 30, switch arms 31 and 32, and cooperating contacts 33 and 34. The relay coil upon being energized is adapted to move switch arms 31 and 32 into engagement with contacts 33 and 34, respectively. Switch arms 31 and 32 are normally biased to an open position so that when said relay coil is de-energized the switch arms are held out of engagement with their respective contacts.

The relay 29 is furnished with low voltage power by means of a step-down transformer 35. Said step-down transformer comprises a high voltage primary 36 and a low voltage secondary 37. Said primary is connected through conductors 38 and 39 with line wires 40 and 41.

The flow of current to relay coil 30 during the initial stages of operation of this system is controlled by a thermal time switch indicated by the reference numeral 42. This switch is preferably of the form shown in the patent to F. S. Denison, No. 1,958,081, issued May 8, 1935. As shown for purposes of illustration in the drawings, the switch comprises two switch arms 43 and 44 which are held in engagement by bimetallic element 45. Associated with said bimetallic element is a heater element 46. During the initial stages of operation of this system current flows through this heater element and if said current flow continues sufficiently long, the bimetallic element 45 will be heated sufficiently so that it is moved to the right out of engagement with switch arm 44 allowing the same to fall and separate from switch arm 43. After the switch has opened, it cannot close automatically but must be re-set manually.

The means which I employ for checking the spark and making the starting of the motor dependent upon the presence of a proper spark in the spark gap is indicated generally by the reference numeral 47. Said means includes a relay coil 48 which when energized causes a switch arm 49 to move into engagement with a contact 50 to close the motor circuit. Also included in said means is a plurality of vacuum tubes 50 and 51. Vacuum tube 50 comprises a filament 52 and a plate 53 and serves to rectify the current passing through the spark check circuit. Vacuum tube 51 comprises a filament 54, a grid 55 and a plate 56. The spark check circuit is energized by means of an inductance coil 57 inductively coupled with a similar coil 58 in the ignition circuit. Coil 58 is located adjacent the spark gap electrodes for reasons to be hereinafter given. Said inductance coil 57 is connected through conductors 59 and 60 to vacuum tubes 50 and 51. Plate 53 of vacuum tube 50 is connected to filament 54 of vacuum tube 51 through conductor 61 and battery 64. Connected between conductors 60 and 61 is a condenser 62 which tends to smooth out the pulsations of the current flowing to vacuum tube 51. Connected across said conductors 60 and 61 and in parallel with said condenser is a resistance 63 which serves as a coupling resistance between said tubes. Battery 64 serves to bias the grid negatively with respect to the filament so as to prevent current flowing through the plate circuit when coil 57 is insufficiently energized. The relay coil is connected in the output circuit of plate 51 in series with a battery 65 which supplies the plate potential for the tube. Connected to filaments 52 and 54 are windings 66 and 67 which windings constitute the secondary of a transformer 68, which transformer comprises in addition to such secondary a high voltage primary 69.

A relay 70 is designed to be brought into operation after combustion has taken place so as to bring the system into the position which it assumes during running conditions. This relay comprises a relay coil 71 adapted to be energized upon the operation of stack switch 79 to be presently described. Associated with said relay coil 71 are switch arms 72 and 73. The switch arms are so biased that when relay coil 71 is de-energized they are in engagement with contacts 74 and 75, respectively. Upon energization of said relay coil the switch arms 72 and 73 are moved into engagement with contacts 76 and 77, respectively. Contacts 75 and 77 are of the overlapping type so that switch arm 73 moves into engagement with contact 77 before moving out of engagement with contact 75.

The stack switch referred to in the previous paragraph as controlling the operation of relay coil 71 is preferably of the form disclosed in the patent to Benjamin Cyr, No. 1,768,892, issued July 1, 1930. This stack switch comprises a contact arm 80 adapted to be brought into engagement with a contact 81. Said arm is actuated by a bimetallic element 82 which is located in the stack and is adapted upon being heated to cause said switch arm to move into engagement with contact 81.

The apparatus is shown in the position which it assumes before there is a call for heat or, in other words, when the temperature of the space is above the value for which the thermostat is set. Upon the temperature falling below said predetermined value contact arm 24 is caused to move to the left. Contacts 25 and 26 are first brought into engagement but the enclosing of these contacts does not close the energizing circuit. If the temperature continues to fall contacts 27 and 28 will be brought into engagement. Upon the engagement of these contacts the following energizing circuit will be established: From secondary 37, through conductor 85, relay coil 30, conductor 86, heater element 46, conductor 87, conductor 88, switch arm 72, contact 74, conductor 89, contacts 28 and 27, contact arm 24, contacts 25 and 26, conductor 90, switch arms 43 and 44, conductor 91, and back to the secondary 37.

The establishment of the previously traced energizing circuit will cause relay coil 30 to be energized with the result that switch arms 31 and 32 are brought into engagement with contacts 33 and 34. The moving of switch arm 31 into engagement with contact 33 establishes the following holding circuit: From secondary 37, through conductor 85, relay coil 30, conductor 86, heater element 46, conductor 87, switch arm 31, contact 33, conductor 92, through bimetallic element 23, contacts 25 and 26, conductor 90, switch arms 43 and 44, conductor 91, back to the secondary 37. It will be noted that this holding circuit does not depend upon engagement of contact 27 with 28, the engagement of which was necessary in order to establish the energizing circuit. Thus, even though the contact arm 24 should move slightly to the right, the holding circuit would not be broken.

The energization of relay coil 30 with the resultant moving of switch arm 32 into engagement with contact 34, also establishes the following circuit. From line wire 40, through conductor 94, contact 34, switch arm 32, conductor 95, conductor 96, switch arm 73, contact 75, conductor 97, primary 21, through conductor 98, to the other line wire 41. This establishes a circuit through the ignition primary and causes the ignition circuit to be energized. If the circuit is in proper condition and the electrodes are properly spaced, a spark will appear across electrodes 14 and 15 of the proper characteristics to ignite any fuel issuing from nozzle 11. Due to the inherent capacity between the conductors leading to the spark gap and of the coil 17, the spark discharge will be oscillatory in character. Thus the presence of this spark in spark gap 16 will cause a flow of high frequency current through the ignition circuit.

At the same time that switch arm 32 is moved into engagement with contact 34 with the resultant energization of the ignition circuit, the following circuit will also be established: From line wire 40, through conductor 94, contact 34, switch arm 32, conductor 95, conductor 99, primary 69, conductor 100, to the other line wire 41. This causes the energization of primary 69 with the resultant energization of secondaries 66 and 67. As previously stated, these secondaries are connected to filaments 52 and 54 and upon being energized cause a flow of current through said filaments which acts to heat the same. The heating of these filaments causes the spark check to be in condition for operation.

As previously mentioned, if there is a proper spark between electrodes 14 and 15, a high frequency current will flow in the ignition circuit. By reason of the inductive coupling between inductances 57 and 58 a high frequency current will tend to flow through the spark check circuit. Vacuum tube 50, which is connected in series with said circuit, acts to prevent the flow of said high frequency current in one direction so that the current flowing through that portion of the circuit across which the condenser is connected is a high frequency pulsating direct current. Condenser 62 acts to smooth out the pulsations of this current so that the current flowing through resistance 63 will be only slightly pulsating. The flow of this current through resistance 63 impresses a voltage on grid 55 in opposition to the bias established by battery 64. When the spark in the spark gap is proper, this potential will be sufficient to overcome said bias sufficiently to cause a flow of current through the plate circuit and through relay coil 48 of sufficient magnitude to cause the relay coil to bring switch arm 49 into engagement with contact 50, thus establishing the following motor circuit: From line wire 40, through conductor 94, contact 34, switch arm 32, conductor 95, conductor 96, conductor 101, switch arm 49, contact 50, conductor 102, conductor 103, through the motor, and through conductor 104 to the other line wire 41. This will cause the motor to deliver fuel through the nozzle 11 and establish combustion under normal conditions.

The operation of the spark check has been described for those conditions under which a normal spark occurs in the spark gap. If for any reason the electrodes should be either too closely spaced to each other, or should have some foreign matter therebetween so as to cause a complete or partial short-circuit therebetween, the high frequency component of the current flowing through the ignition circuit will be relatively small so that the current flowing through said circuit will tend to be largely of the relatively low frequency of that supplied by line wires 40 and 41. This frequency is so low that the voltage induced in inductance 57 will not be sufficient to overcome the biasing voltage of battery 64 sufficient to cause an energizing current to flow through relay coil 48. If, on the other hand, the electrodes 14 and 15 should be spaced too far apart, or due to a break in the circuit somewhere there is an open circuit, no current will flow through this circuit at all and, obviously, relay coil 48 will not be energized.

If it should so happen that a spark should occur between conductors 19 and 20 at some point between inductance 58 and secondary 17, my spark check would not respond even though the spark had the same characteristics as the spark desired in the spark gap. The reason for this is that where there is such a spark, the current flow does not take place through that portion of the circuit in which inductance 58 is located. In consequence, there is no voltage induced in inductance 57 and the bias on the grid is not changed. Inductance 58 is located adjacent the spark gap to minimize the length of the leads across which a spark may take place and cause the spark check to operate.

If combustion takes place hot gases will pass up the stack and this, after a very short period of time, will heat the bimetallic element 82 sufficiently to cause switch arm 80 to move into engagement with contact 81. This will establish the following circuit through relay coil 71: From line wire 40, through conductor 105, contact 81, switch arm 80, conductor 106, relay coil 71 and conductor 107, to the other line wire 41. The energization of relay coil 71 causes switch arm 72 to move out of engagement with contact 74 and into engagement with contact 76. This causes the initial energizing circuit to be broken and causes the following new holding circuit to be established: From secondary 37, through conductor 85, relay coil 30, conductor 108, contact 76, switch arm 72, conductor 88, switch arm 31, contact 33, conductor 92, bimetallic element 23, contacts 25 and 26, conductor 90, switch arms 43 and 44, conductor 91, back to the secondary 37. It will be noted that the new holding circuit does not include heating element 46. While the circuit through this heating element has not been broken, the new circuit constitutes a shunt across said heating element and due to its relatively low resistance very low current will flow through the high resistance heating element.

The energization of relay coil 71 also causes switch arm 73 to move out of engagement with contact 75 and into engagement with contact 77. The moving of switch arm 73 out of engagement with contact 75 breaks the previously sketched circuit through the primary 21 of the ignition transformer and thus de-energizes the ignition circuit. This would cause the spark check apparatus to cease to operate relay 48 with the result that the motor circuit would be broken, if it were not for the following provision. Before switch arm 73 is out of engagement with contact 75 it moves into engagement with contact 77 which over-laps therewith and upon said switch arm engaging with said last mentioned contact, the following new motor circuit is established: From conductor 40, through conductor 94, contact 34, switch arm 32, conductor 95, conductor 96, switch arm 73, contact 77, conductor 109, conductor 103, through the motor and through conductor 104 to the other line wire 41. It will be noted that this new motor circuit is entirely independent of switch arm 49 and contact 50 so that the motor will continue in operation after said last mentioned switch arm separates from its associated contact.

If for any reason, combustion should not take place in spite of the presence of the proper spark, relay coil 71 will not be energized and switch arm 72 will not be moved into engagement with contact 76. The result of this will be that the current continues to flow through the original holding circuit which includes heating element 46. If this circuit continues sufficiently long the bimetallic element will be deflected to the right allowing switch arms 43 and 44 to be separated. This will break the circuit through relay coil 30 causing the apparatus to assume its original position. The thermal switch 32 cannot be closed automatically and the apparatus will not start up again until an attendant is able to come and remedy the defect.

If combustion should be initially started and after a short period of time combustion should stop for some reason, hot gases will cease to go up the stack. This will cause stack switch 79 to open and will cause relay coil 71 to be de-energized. The result of this de-energization of relay coil 71 will be that the new holding circuit for relay coil 30 is broken so that all current flowing through relay coil 30 again flows through the heating element 46. The further result of the de-energization of the relay coil 71 will be that the ignition circuit is again energized because of switch arm 73 again being in engagement with contact 75. At the same time the motor will be stopped due to switch arm 73 being out of engagement with contact 77 so that no more fuel will be fed through nozzle 11 until a proper spark appears at the spark gap. If conditions are proper for securing combustion, the apparatus will again go through the cycle outlined in an earlier portion of the specification, with the result that combustion takes place and stack switch 79 is again closed bringing the apparatus into the position which it assumes under normal running conditions. If combustion should not take place, thermal switch 42 will eventually open. It will be noted in this connection that transformer 68 remains energized so long as relay coil 30 is energized. This will result in filaments 52 and 54 remaining heated so long as said thermostat is calling for heat. Thus, in the event that combustion should suddenly be interrupted, as just discussed, filaments 52 and 53 will already be heated so that the spark check apparatus will be ready to instantly respond to the establishment of a spark in spark gap 16. In this manner the time between the time combustion ceases and the apparatus is brought to a position to restore combustion is materially reduced.

It will be seen that I have provided a new and novel fuel combustion control system wherein provision is made for all contingencies likely to occur in the operation of the same. Means are provided for insuring that no fuel will be delivered through the burner nozzle until there is a spark present which spark has the proper characteristics to ignite said fuel. In this manner there is no danger of an explosion due to the ignition means suddenly becoming effective after being ineffective for a while and igniting the accumulated fuel. My apparatus will, moreover, respond only to a spark at or closely adjacent to the spark gap and will not operate if there is a spark at some other point.

In Figure 2 of my drawings, I have shown a modified form of my spark checking apparatus. Since the rest of the temperature control system is of the same form as that shown in Figure 1, the rest of the system has been omitted in this figure in order to simplify the same.

In this figure the electrically operated oil burner is designated by the reference numeral 110. As in the preceding case, the burner comprises a nozzle designated by the numeral 111, and a motor having a terminal box 112. Electrodes 113 and 114 are spaced apart to provide a spark gap 115 and are connected by conductors 116 and 117 to a secondary 118 of a step-up transformer 119. Said transformer comprises a primary 120 which corresponds to the primary 21 of transformer 18 in Figure 1, and is connected through conductors 121 and 122 to a source of power in the same manner as is said primary 21.

A spark check circuit designated generally by the reference numeral 123 is energized by means of an inductance 124 coupled with an inductance 125 in the ignition circuit. The apparatus described so far has been the same as that in the species of Figure 1. In lieu, however, of a plurality of vacuum tubes such as were employed in the previously described species, I employ in this species a gas-filled thermionic tube 126 of the type known as a "Thyratron" tube. This tube comprises a gas-filled receptacle 127 in which are located a filament 128, a control grid 129 and a plate 130. The inductance 124 is coupled at one end to the grid through conductor 131 and at the other end to filament 128 and conductor 132, to form a grid circuit. A battery 133 is located in said grid circuit and serves to bias said grid negatively with respect to said filament.

A transformer 134 is employed to supply current to the filament 128 and to maintain an alternating potential difference between the plate 130 and filament 128. Said transformer comprises a primary winding 135 and two secondary windings 136 and 137. Said primary winding corresponds to the primary 69 of Figure 1 and is connected to the source of power in exactly the same manner. Secondary 136 is connected to filament 128 and causes a current to flow to said filament to heat the same. Secondary 137 is connected at one end to the mid point of secondary 136 and at the other end to the plate 130 through a relay coil 138 by means of conductors 139 and 140. Secondary 137 when energized acts to maintain an alternating potential between plate 130 and filament 128.

Said relay coil 138 is designed when energized to cause switch arm 141 to move into engagement with contact 142 and to close the motor circuit controlled by said switch. Said switch arm 141 and contact 142 correspond to switch arm 49 and contact 50 of Figure 1, and are connected to the motor and to a suitable source of power in exactly the same manner.

Connected between conductors 139 and 140 in parallel with relay coil 138 is a condenser 143. This condenser acts to smooth out the pulsations of a current flowing through the relay coil and hence to make the operation of said relay coil smoother.

Upon the ignition circuit being energized and a proper spark appearing in spark gap 115, a high frequency current will flow through the ignition circuit as in the previous case. Inductance 124 will thus be energized and will cause a high frequency potential to be applied between said grid and said filament. This potential applied to the grid is an alternating potential and will periodically, corresponding to the frequency of the induced current, oppose the action of biasing battery 133 with the result that a grid potential is periodically raised sufficiently with respect to said filament to cause a flow of current through the plate circuit due to secondary 137. Secondary 137 tends to cause an alternating current of the same frequency as the supply voltage to flow through the plate circuit including relay coil 138. Due, however, to the fact that the current only flows in one direction between the filament and the plate, the current flowing in said plate circuit will be a direct pulsating current. This pulsating current is, as previously mentioned, smoothed out by the action of condenser 143 so that the current flowing through relay coil 138 will be only slightly pulsating.

The voltage induced in the grid circuit has a frequency which is very much higher than the frequency of the current supplied by secondary 137. Consequently, the potential on the grid is periodically brought below a value which would cause current to flow through such plate circuit at a much higher frequency than the variations in the plate potential. This will not affect the frequency of the current through the plate circuit, however, because of the characteristics of this type of tube. In this type of tube, the grid has no control of the current after such flow has once been started and the only way to stop the flow of current in such a tube is to make the plate negative with respect to the filament. This action of the grid is commonly referred to as a "trigger" action. Due to the fact that the potential induced by secondary 137 is an alternating one, plate 130 is made negative with respect to filament 128 periodically with a frequency equal to that of the supplied current. Since the grid is being periodically brought to a voltage sufficient to cause current flow between the filament and plate at a much higher frequency than that of said plate voltage, plate current will start flowing immediately upon the plate becoming positive again. If, however, no high frequency voltage is being applied to grid 129 at the instant when said plate again becomes positive with respect to said filament, the bias caused by battery 133 will prevent the flow of plate current from starting again. Thus, there will be a flow through the plate circuit of direct, pulsating current of a frequency corresponding to that of the power supply, as long as a high frequency voltage is induced in the grid circuit.

As in the preceding case, the bias between the grid and the filament is sufficient so that if the relatively low frequency current accompanying a short-circuit is flowing through the ignition circuit the voltage induced in conductor 134 will not be sufficient to overcome the bias sufficiently to cause a flow of plate current to be started. Since the coupling between the ignition circuit and the spark check circuit is made in the same way as in my previous form, the spark check circuit will for the same reasons not respond to a spark between the secondary 118 and the electrodes 113 and 114, nor will it respond if the ignition circuit is open. It will thus be seen that this species has the same advantages as the previous one.

While I have described two detailed embodiments of my invention, it will be understood that these are for purposes of illustration only and that my invention is limited only by the scope of the appended claims.

I claim as my invention:

1. In a fuel combustion system, a burner, electrically operated means controlling the flow of fuel to said burner, a high voltage circuit including a source of high voltage and a sprak gap for igniting the fuel supplied by said fuel feeding means and having sufficient capacity that the occurrence of a proper spark in said spark gap causes the flow of a high frequency current in said high voltage circuit, means for controlling the operation of said fuel flow controlling means, said last named means comprising a device coupled to said high voltage circuit at a point adjacent to said spark gap and responsive only to the presence of a high frequency current flow in said high voltage circuit adjacent said spark gap and operative to cause said flow controlling means to cause a flow of fuel to said burner only when there is a flow of high frequency current through said high voltage circuit adjacent the spark gap.

2. In a fuel combustion system, a burner, electrically operated means controlling the flow of fuel to said burner, a high voltage circuit including a source of high voltage and a spark gap for igniting the fuel supplied by said fuel feeding means and having sufficient capacity that the occurrence of a proper spark in said spark gap causes the flow of a high frequency current in said high voltage circuit, means for controlling the operation of said fuel flow controlling means, said last named means comprising an inductance connected in series with said source of high voltage and said spark gap and being adjacent to said spark gap and operative to cause said flow controlling means to cause a flow of fuel to said burner only when there is a flow of high frequency current through said inductance.

3. In a fuel combustion system, a burner, electrically operated means controlling the flow of fuel to said burner, a high voltage circuit including a source of high voltage and a spark gap for igniting the fuel supplied by said fuel feeding means and having sufficient capacity that the occurrence of a proper spark causes the flow of a high frequency current in said high voltage circuit, means for controlling the operation of said fuel flow controlling means, said last named means comprising a transformer having its primary connected in series with said source and said spark gap and being adjacent to said spark gap and its secondary connected so as to control the operation of said fuel flow controlling means, said means for controlling said fuel controlling means being operative to cause the latter to cause fuel to be delivered to the burner only when there is a high frequency current flow through said primary.

4. In a fuel combustion system, a burner, electrically operated means controlling the flow of fuel to said burner, a high voltage circuit including a source of high voltage and a spark gap for igniting the fuel supplied by said fuel feeding means and having sufficient capacity that the occurrence of a proper spark in said spark gap causes the flow of a high frequency current in said high voltage circuit, means for controlling the operation of said fuel flow controlling means, said last named means comprising a space discharge amplifier, and a transformer having a low magnetic coupling, said transformer having its primary connected in series with said source and said spark gap and being closely adjacent said spark gap and its secondary in the input circuit of said amplifier, said amplifier being effective to cause said fuel flow controlling means to cause a flow of fuel to the burner only when there is a flow of high frequency current through said primary.

5. A fuel combustion system comprising a burner, means controlling the flow of fuel to said burner, a circuit including a source of high voltage and spark gap means for igniting the fuel delivered to said burner, means responsive to a high frequency current produced only upon the occurrence of a proper type of spark in or closely adjacent to said spark gap means for controlling operation of said means controlling the flow of fuel, said high frequency current responsive means including an element closely adjacent to said spark gap means and in series with said spark gap means and said source of high voltage.

WILLIS H. GILLE.

CERTIFICATE OF CORRECTION.

Patent No. 2,154,041.  April 11, 1939.

WILLIS H. GILLE.

It is hereby certified that error appears in the printed specification of the above numbered patent requiring correction as follows: Page 2, second column, line 23, for the word "enclosing" read closing; and that the said Letters Patent should be read with this correction therein that the same may conform to the record of the case in the Patent Office.

Signed and sealed this 20th day of June, A. D. 1939.

(Seal)

Henry Van Arsdale
Acting Commissioner of Patents.